No. 844,838. PATENTED FEB. 19, 1907.
L. R. WHEELER.
DEVICE FOR REGISTERING VIBRATIONS OF MUSICAL SOUNDS.
APPLICATION FILED DEC. 6, 1906.
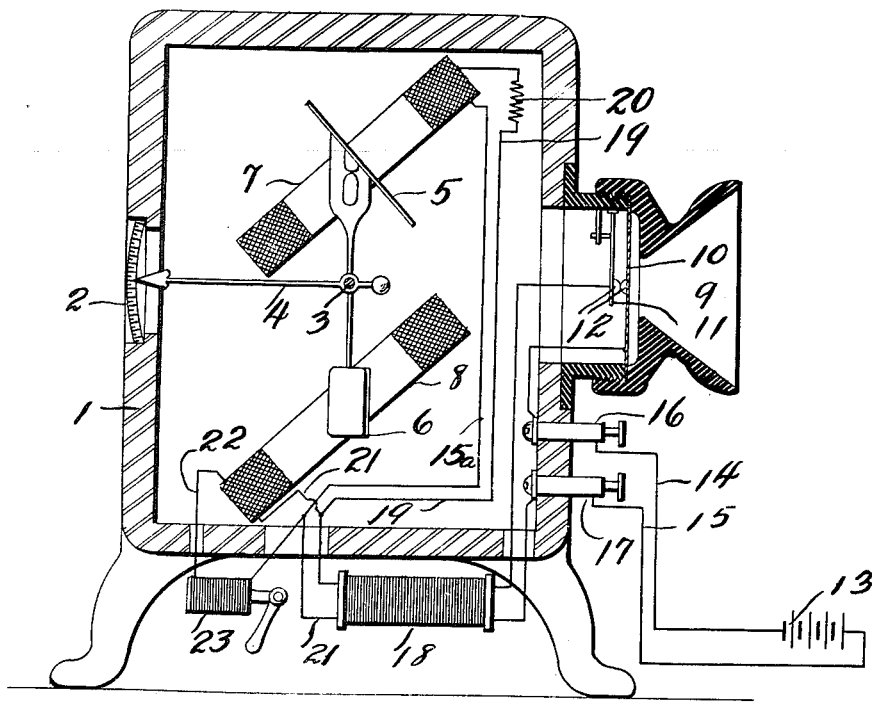

UNITED STATES PATENT OFFICE.

LEWIS R. WHEELER, OF TACOMA, WASHINGTON.

DEVICE FOR REGISTERING VIBRATIONS OF MUSICAL SOUNDS.

No. 844,838.　　　Specification of Letters Patent.　　　Patented Feb. 19, 1907.

Application filed December 6, 1906. Serial No. 346,634.

*To all whom it may concern:*

Be it known that I, LEWIS R. WHEELER, a citizen of the United States, residing at Tacoma, in the county of Pierce and State of Washington, have invented certain new and useful Improvements in Devices for Registering Vibrations of Musical Sounds, of which the following is a specification.

This invention is a new and useful apparatus for indicating the pitch or frequency of vibrations of sounds, and it is particularly designed for use in tuning musical instruments.

The invention embodies means for indicating by a pointer and scale or dial the exact number of vibrations in any tone or sound ranging between the number of vibrations distinguishing mere noise and the number of vibrations distinguishing music—that is, between about twenty vibrations per second minimum and in general practice four thousand one hundred vibrations per second maximum.

The invention primarily aims to provide an apparatus which will generate a current of electricity having a frequency or number of alternations per second proportional to the frequency of vibrations of a given vibrating string, column of air, or other sonorous body.

The invention further aims to provide, in combination with the above-named means, means for determining the frequency of said current and for visibly indicating the same.

The invention further aims to provide a scale calibrated chromatically, so that the indicator will disclose the exact pitch of any musical sound, so that in practical use any one familiar with the nature and use of the instrument can readily tune the most difficult instrument without experience or knowledge of music, no matter how little ear for music such person may have.

The detailed construction will appear in the course of the following description, in which reference is had to the accompanying drawing, forming a part of this specification, like numerals designating like parts.

The figure illustrates a longitudinal vertical section of a device constructed in accordance with my invention and shows diagrammatically the various electrical connections.

In the practical embodiment of my invention I employ a suitable casing 1, provided in its rear wall with a calibrated scale 2, marked off with the letters of the chromatic scale or number of vibrations per second corresponding thereto. A shaft 3 is journaled in pivot-bearings (not shown) in the casing 1, and upon said shaft is fixed a balanced indicator-hand 4, which is provided on each side thereof with rigidly-secured armatures 5 and 6. The armatures 5 and 6 are designed to be attracted by respective magnets 7 and 8, disposed adjacent thereto and in their movement in either direction to move the hand correspondingly. In the front of the casing 1 is mounted a sound-receiver 9 of any approved type for the functions contemplated, a receiver of the Berliner-transmitter type being arbitrarily shown for convenience of illustration and description. Such receiver is provided with a diaphragm 10 and a vibrating spring 11, the diaphragm 10 and spring 11 being provided with the carbon hemispheres 12 in spring-pressed contact with each other.

For the purpose of generating a primary current a battery 13 is provided, from which lead wires 14 and 15. The wire 14 passes through a binding-post 16 and has connection with the diaphragm 10. The wire 15 passes through a binding-post 17 and the primary winding of an induction-coil 18, from whence it leads to the vibrating spring 11. The vibrations of the diaphragm 10, it will be understood, serve to induce currents in the secondary coil of the inductorium 18 by virtue of the variation in resistance between the carbon hemispheres 12. The frequency of the alternations of the current in the induced circuit of the coil will be directly proportional to the frequency of the vibrations of the sound received by the diaphragm.

From the secondary winding of the induction-coil 18 a wire 21 leads to the electromagnet 8, from which a return-wire 22 leads back to the secondary winding of the induction-coil 18 through an inductive resistance 23. The electromagnet 7 is shunted into the said secondary circuit by wires 15ª and 19, leading from the wires 22 and 21, respectively. The wire 19 leads from the magnet 7 through an anti-inductive resistance 20 and from said resistance to the wire 21.

In the practical use of the instrument the electromagnets 7 and 8 tend to rotate the shaft 3 in opposite directions by reason of their influence upon the armatures 5 and 6, respectively. They are so arranged that when the shaft rotates in one direction the torque of the magnet which tends to rotate it decreases and the torque of the other magnet increases. Under the influence of the two magnets the shaft will take a position where the torques are equal. If the torque of one magnet varies, the shaft takes up another position determined by the balance of the two forces. The resistance in series with one of the magnets is, as above stated, inductive and the other resistance is non-inductive. Any change in the frequency of the circuit will therefore unbalance the forces acting upon the shaft and bring the shaft as well as the pointer connected to the shaft to a new position, such new position being arbitrarily arranged to bear a direct relation to and to indicate directly the pitch or number of vibrations per second of the sound produced in the neighborhood of the receiver 9.

It will therefore be seen from the foregoing description that the action of the magnets upon the armatures corresponds to the action of a frequency-meter and that the disclosure is purely arbitrary as regards this feature. Any form of frequency-meter capable of performing the functions contemplated may be advantageously employed, it being understood that the invention consists, essentially, in the idea of tuning instruments in accordance with the indicated strength of an alternating current corresponding in frequency with the frequency of the sound-vibrations.

While the elements herein shown and described are well adapted to serve the functions set forth, it is obvious that various minor changes may be made in the proportions, shape, and arrangement of the several parts without departing from the spirit and scope of the invention as defined in the appended claims.

Having fully described my invention, I claim—

1. A device of the character described comprising an inductorium, a variable-resistance sound-receiver in circuit with the primary coil thereof and means in circuit with the secondary coil to indicate relative changes in the frequency of alternations of the secondary current.

2. A device of the character described comprising an inductorium, a variable-resistance sound-receiver in circuit with the primary coil thereof, means in circuit with the secondary coil adapted to indicate the relative frequency of alternations of the secondary current and a scale associated with said last-named means calibrated to indicate the said relative frequency of the alternations in terms corresponding to the number of vibrations per second of sound received in the said receiver whereby the pitch of said sound is indicated on the said scale.

3. A device of the type set forth comprising an inductorium, a variable-resistance sound-receiver in circuit with the primary coil thereof, a shunt-circuit connected with the secondary coil of said inductorium and having an anti-inductive resistance therein, a second shunt-circuit similarly connected and having an inductive resistance therein, electromagnets in each of said secondary circuits, pivoted armatures rigidly secured together and arranged adjacent the said magnets and adapted for movement with relation thereto corresponding to the frequency of the current passing through said magnets, an indicating-hand controlled by the movement of said armatures and a calibrated scale associated with said hand.

In testimony whereof I affix my signature in presence of two witnesses.

LEWIS R. WHEELER.

Witnesses:
L. H. HIGGINS,
J. L. COATES.